(12) United States Patent
Arose

(10) Patent No.: US 9,722,876 B2
(45) Date of Patent: Aug. 1, 2017

(54) IDENTIFYING THE LOGICAL LOCATION OF A NETWORK DEVICE ON A CUSTOMER'S LAN

(71) Applicant: Vonage America Inc., Holmdel, NJ (US)

(72) Inventor: Joseph Arose, Freehold, NJ (US)

(73) Assignee: Vonage America Inc., Holmdel, NJ (US)

( * ) Notice: Subject to any disclaimer, the term of this patent is extended or adjusted under 35 U.S.C. 154(b) by 94 days.

(21) Appl. No.: 14/264,842

(22) Filed: Apr. 29, 2014

(65) Prior Publication Data

US 2015/0312103 A1 Oct. 29, 2015

(51) Int. Cl.
*H04L 12/28* (2006.01)
*H04L 12/24* (2006.01)

(52) U.S. Cl.
CPC .................................. *H04L 41/12* (2013.01)

(58) Field of Classification Search
CPC .......................................................... H04L 12/28
See application file for complete search history.

(56) References Cited

U.S. PATENT DOCUMENTS

| 7,903,585 B2 * | 3/2011 | Feng ................. H04L 29/12518 370/255 |
| 2010/0260066 A1 * | 10/2010 | August ............ H04L 29/12028 370/254 |
| 2014/0003255 A1 | 1/2014 | Beyer | |

* cited by examiner

*Primary Examiner* — Kevin Cunningham
(74) *Attorney, Agent, or Firm* — Moser Taboada; Joseph Pagnotta

(57) ABSTRACT

A method and apparatus for identifying logical locations of network devices on a Local Area Network (LAN) is provided herein. The method may include receiving an input including a network identifier of a network terminal adaptor on a LAN, determining, using the received network identifier, one or more network devices connected upstream of the TA, wherein a network address of each of the one or more network devices connected upstream is filtered such that only network devices including a private IP address are identified; determining device telemetry data associated with each determined network device and the network terminal adaptor, and generating, using the device telemetry data, a data structure including (a) a representation of a logical location of the network terminal adaptor and of each determined network device connected to the LAN, and (b) at least some of the device telemetry data.

22 Claims, 8 Drawing Sheets

IDENTIFYING THE LOGICAL LOCATION OF A NETWORK DEVICE ON A CUSTOMER'S LAN

BACKGROUND OF THE INVENTION

Field of the invention

Embodiments of the present invention generally relate to computer networks and, more particularly, to a method and apparatus for identifying logical locations of network devices on a Local Area Network (LAN).

Description of the Related Art

Voice-over-Internet Protocol (VoIP) is a technological development in the field of telecommunications that is utilized to transmit voice conversations over a data network using Internet Protocol (IP) packets rather than the existing and traditional telecommunications system more commonly referred to as the Public Switched Telephone Network (PSTN) or Plain Old Telephone Service (POTS). Entities (e.g., businesses or individuals) implement VoIP by purchasing and installing the necessary equipment (e.g., one or more VoIP Terminal Adaptors (TA)) to access a VoIP service provider and activating this telecommunication service via a broadband Internet connection.

Typically, entities will not solely have telecommunications equipment connected to the broadband Internet connection. Various other data networking devices including but not limited to computers, peripherals and wireless networking devices will comprise a substantial Local Area Network (LAN) that is connected to a Wide Area Network (WAN) with a multitude of services available via the broadband Internet connection. Such VoIP systems may interface with other devices connected to the home network. However, these other devices connected to a user's home network may cause problems with the VoIP systems/service if not operating properly, configured incorrectly, outdated, and the like.

Typically, VoIP service providers have customer care service centers to interact with and provide customer service to VoIP telephony users. One problem typically encountered by customers who interact with a support communications center is the need to provide detailed sets of information regarding the state and configuration of the customer's internal home network (e.g., how network devices are connected in the customer's internal home network) each time the customer starts a communications session or interacts with an operator. This information is typically required in order to troubleshoot problems that may be encountered by a VoIP telephony user.

Current methods for automatically determining a network topology of a customer's LAN often erroneously lead to the identification of devices connected to the customer's LAN, but not associated with the customer's account. For example, a LAN in an apartment building may include multiple different devices associated with multiple different customers. Specifically, current methods not only identify and display the immediate customer's home network, but every device directly attached to the internet service provider (ISP) switch in the apartment building or neighborhood.

It would be beneficial if methods and apparatus were developed which improved the customer experience by reducing the amount of redundant or inaccurate customer input. In addition to improving the customer experience, the reduced time to ascertain the state and configuration of a user's home network would translate directly into reduced costs and improve capital utilization. Therefore, there is a need in the art for an improved method and apparatus for determining the network topology of a customer's LAN while filtering out other customers' networks/accounts.

SUMMARY OF THE INVENTION

A method and apparatus for identifying logical locations of network devices on a customer's LAN are provided herein. In some embodiments, the method includes receiving an input including a network identifier of a network terminal adaptor on a LAN, identifying, using the received network identifier, one or more network devices connected upstream of the TA, wherein a network address of each of the one or more network devices connected upstream is filtered such that only network devices including a private IP address are identified; determining network devices connected downstream of the network terminal adapter on the LAN; determining device telemetry data associated with each determined network device and the network terminal adaptor, and generating, using the device telemetry data, a data structure including (a) a representation of a logical location of the network terminal adaptor and of each determined network device connected to the LAN, and (b) at least some of the device telemetry data.

In some embodiments, a system for identifying logical locations of network devices on a customer's LAN is provided which includes one or more servers configured to receive device telemetry information from a plurality of network devices disposed on customers' local area networks (LANs), a device telemetry database that stores the device telemetry information received by the one or more servers, and a LAN topology generation application configured to: receive an input including a network identifier of a network terminal adaptor on a LAN; identify, using the received network identifier, one or more network devices connected upstream or downstream of the network terminal adaptor, wherein a network address of each of the one or more network devices connected upstream is filtered such that only network devices including a private IP address are identified; and generate, using the device telemetry data, a data structure including (a) a representation of a logical location of each of the network terminal adaptor and of each determined network device connected to the network terminal adaptor on the LAN, and (b) at least some of the device telemetry data.

In some embodiments, a computer readable medium storing a software program that, when executed by a computer, causes the computer to perform a method for identifying logical locations of network devices on a customer's LAN including receiving an input including a network identifier of a network terminal adaptor on a LAN, identifying, using the received network identifier, one or more network devices connected upstream of the TA, wherein a network address of each of the one or more network devices connected upstream is filtered such that only network devices including a private IP address are identified; determining device telemetry data associated with each determined network device, and generating, using the device telemetry data, a data structure including (a) a representation of a logical location of each of the network terminal adaptor and of each determined network device connected to the network terminal adaptor on the LAN, and (b) at least some of the device telemetry data.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the methods and apparatus are described herein by way of example for several embodiments and illustrative drawings, those skilled in the art will recognize that method and apparatus for identifying logical locations of network devices on a LAN is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of method and apparatus for identifying logical locations of network devices on a customer's Local Area Network. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Embodiments of the present invention include a method and apparatus for identifying logical locations of network devices on a customer's LAN. Using previously collected device telemetry environmental data (DTC data) from VoIP terminal adaptors on a customer's LAN, a logical representation of a customer's home network topology can be generated. DTC data is essentially a snapshot of a TA's WAN/LAN IP Addresses, LAN Dynamic Host Configuration Protocol (DHCP) Client Data, and WAN gateway data (i.e., a thorough depiction of network devices connected upstream and downstream of the TA on the LAN). Through a recursive set of processes, a representation of the logical location of network devices on the customer's network can be generated without requiring private access to the customer's LAN.

Various embodiments of an apparatus and method for identifying logical locations of network devices on a customer's LAN are provided below. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Figure 1:
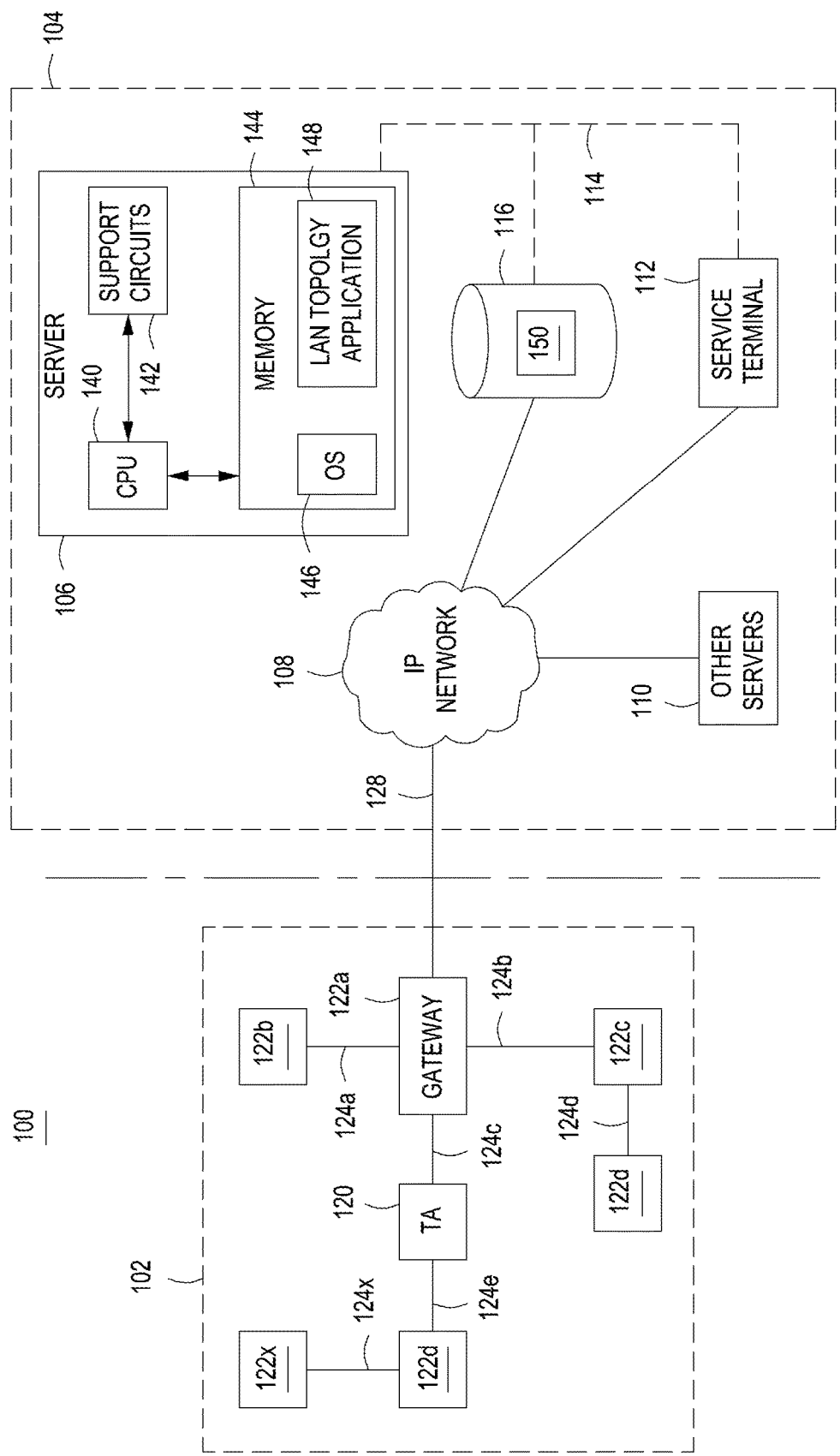
FIG. 1 is a block diagram depicting an exemplary embodiment of a communication system in accordance with one or more aspects of the invention.

FIG. 1 is a block diagram depicting an exemplary embodiment of a communication system 100 in accordance with one or more aspects of the invention. The communication system 100 includes a customer's LAN 102 and a voice-over-internet-protocol (VOIP) network 104. The network 104 includes a server 106 and a plurality of other servers 110 coupled to an internet protocol (IP) network 108. In some embodiments, the servers 110 may be various well known servers configured to facilitate VOIP services, such as provisioning servers, proxy servers, media relay servers, and the like. The server 106 may be communicatively coupled, via IP network 108 or other internal network/links 114, to a database 116 that stores DTC data of various network devices in one or more device telemetry tables 150 ("DTC tables 150"). The server 106 is configured to generate a representation of a network topology of a customer's LAN 102 using the DTC data stored in the DTC table(s), as described below. The server 106 may be implemented using a plurality of computer systems and like-type general and/or specific purpose devices and systems.

The server 106 is represented in the form of a general purpose computer such as those generally known in the art that, when executing particular software becomes a specific purpose computer for performing various embodiments of the present invention. The server 106 may include one or more central processing units (CPU) 140 coupled to each of support circuits 142, and memory 144. The CPU 140 may comprise one or more commercially available microprocessors or microcontrollers that facilitate data processing and storage. The various support circuits 142 are utilized to facilitate the operation of the CPU 140 and may include such circuits as clock circuits, power supplies, cache, input/output (I/O) circuits and devices, modulation/demodulation devices, human interface devices, and the like. In some embodiments, the support circuits 142 may include a display device (not shown) and an input device (not shown) that provides an Internet-based front end to a service representative to accept input and send/receive input that may be used in a LAN topology generation application 148 described below.

The memory 144 may comprise random access memory, read only memory, removable storage, optical disk storage, disk drive storage, flash memory, and combinations thereof. The memory 144 may store software that is executed to perform methods of according to embodiments of the invention. For example, the software can implement at least a portion of the methods 300, 400, 500 and 600 performed by server 106 or other servers 100 in the VoIP network 104 described in greater detail below. The software, when executed by the CPU 140, transforms the general purpose computer into a specific purpose computer that controls methods described herein. The software stored in memory 144 includes an operating system 146 and the LAN topology generation application 148. Such operating system 146 may include Linux, UNIX, Apple OS, Windows, and the like. In operation, the CPU 140 executes the operating system 146 to control the general utilization and functionality of server 106. The LAN topology generation application 148 operates to identify the logical location of network devices on a customer's LAN 102 in some embodiments consistent with the present invention. The LAN topology generation application 148 does so by generating a data structure including a representation of the logical location of network devices connected to LAN 102. In some embodiments, the LAN topology generation application 148 is a standalone application that informs other applications of the network topology of a customer's LAN 102. One of ordinary skill in the art would recognize that such a LAN topology generation application 148 may be implemented as a component of the operating system 146, as a device driver, as part of a separate application, as an application program interface (API) or in any other type of software as commonly known in the art. In some embodiments, the LAN topology generation application 148 may be implemented in any of software, firmware, hardware, or a combination thereof.

In some embodiments consistent with the present invention, a service terminal 112, such as one used by a customer service representative of a VoIP service provider, is coupled to the VoIP network 104. The service terminal 112 may be coupled to server 106 via IP network 108 or via other internal network/links 114 separate from IP network 108. In some embodiments, the service terminal 112 may include a display device (not shown) and an input device (not shown) that provides an Internet-based front end to a service representative to accept input and send/receive input from server 106.

LAN 102 may include a VoIP terminal adaptor (TA) 120 and various network devices 122*a-x*, some of which may also be TAs, coupled directly or indirectly to the IP network 108 via links 128. It should be understood that LAN 102 may include more or less network devices than depicted in FIG. 1. The TA 120 couples to LAN 102 to provide internet telephony service. The TA 120 provides an interface for a phone (not shown) so that a user may connect the phone to TA 120 to enable voice service. The TA 120 transmits and receives telephony signals to a remote server on VoIP network 104 via a gateway network device (for example, network device 122*a*). In some embodiments the TA 120 provides a subscriber line interface circuit (SLIC) for interfacing with standard twisted pair phone cable. In some embodiments, the TA 120 communicates wirelessly with IP phones designed to be used with a VoIP system. Examples of such TAs 120 include the VDV21-VD router and VDV21-CVR wireless IP phone system, available from Vonage Holdings Corporation of Holmdel, N.J. The TA 120 may include a LAN port and a wide area network (WAN) port for configuring the network topology. In some embodiments, more the one TA 120 may be included in LAN 102.

As depicted in FIG. 1, the customer's LAN 102 may include network devices 122*a-x* and TA 120 coupled to each other via various links 124*a-x*. The links 124*a-x* may be direct or indirect hardwire links, wireless connections or a combination thereof. The TA 120 typically collects DTC data from each of the network devices 122*a-x* connected to it on LAN 102. In some embodiments, some of network devices 122*a-x* may also be TAs and will collect DTC data from each of the network devices connected to it. For example, network device 122*c* and 122*e* may be TAs that collect DTC data from network device 122*d* and 122*x*, respectively. In some embodiments, a TA may be able to collect DTC data from all devices connected directly to gateway 122*a* if the gateway 122*a* is connected to the LAN port of the TA 120, and the gateway 122*a* is operating as one of a network hub, a network switch, or a network router in bridge/pass through mode (described herein as a pass-through hub). A pass-through hub does not typically have DTC data associated with it and merely acts as a multiport device that couples one or more child network devices to a DHCP LAN port of a parent device. A DTC report is generated by TA 120, and any other TAs on the network, and sent to at least one of server 106 or other servers 110. The DTC reports sent by TA 120 may be generated and sent on a daily basis, upon startup of the TA 120, by manual request, or by any other configured schedule. The DTC data included in the DTC report is stored in DTC tables 150 in a database (e.g., database 116). The DTC data collected by TA 120 from each network device 122*a-x*, and/or from the TA 120 itself, may include, but is not limited to, device type, device vendor, LAN IP address, WAN IP address, MAC address, software version, uptime, VoIP service provider account number, one or more VoIP phone line numbers, registration status, recent telemetry events, and the like. In some embodiments consistent with the present invention, in the DTC tables 150, each entry for a specific network device stores the MAC and IP Addresses of each device that is connected immediately downstream to the specific network device (i.e., each DHCP client of that device). Thus, the "children" or downstream network devices the specific network device is associated with may be included in DTC tables 150. In addition, in some embodiments consistent with the present invention, each entry for a specific network device stores the specific network device's "wan_router_mac_address" (i.e., the MAC address of the upstream router ("parent") it is connected to). Furthermore, in some embodiments consistent with the present invention, "siblings" of the specific network device can be found by searching for other network devices in the DTC table 150 with that same "wan_router_mac_address."

Figure 2:
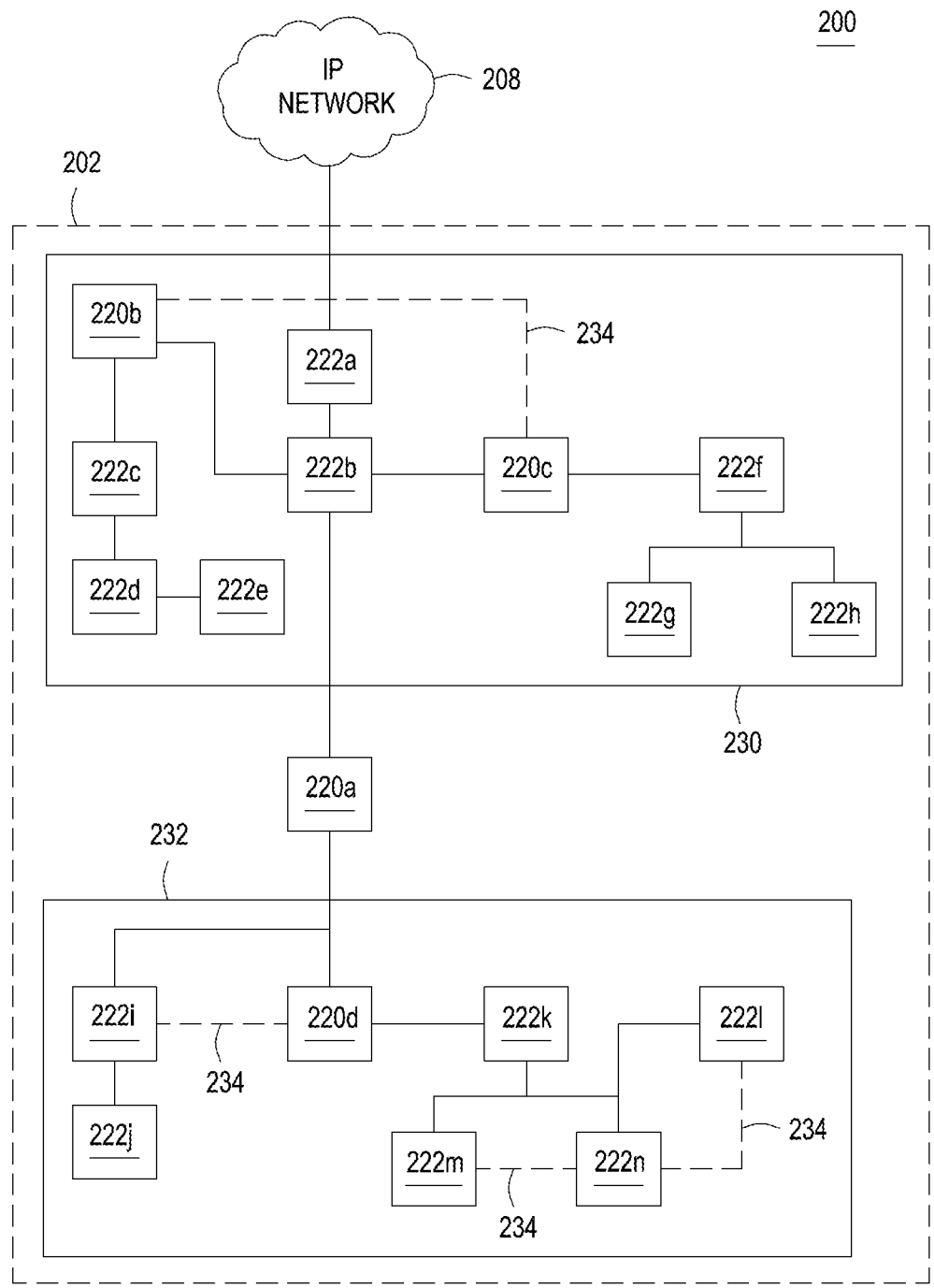
FIG. 2 is a block diagram depicting an exemplary embodiment of a Local Area Network (LAN) topology in accordance with one or more aspects of the invention.

FIG. 2 is a graphical depiction of an exemplary network topology 200 of a customer's LAN 202 that may be generated in accordance with at least some embodiments of the present invention. The customer's LAN 202 is coupled to an IP network 208 via a network device 222*a* (e.g., a gateway or router). Multiple TAs 220*a-d* are shown disposed on LAN 202. A number of network devices 222*a-h* disposed upstream of the TA 220*a* on the LAN 202 are shown in block 230. A number of network devices 222*i-n* disposed downstream of the TA 220*a* on the LAN 202 are shown in block 232.

In embodiments consistent with the present invention, a first network device that is connected upstream of a second network device is one that is coupled to the LAN 202 between the second network device and IP network 208, such that any communication between the second network device and IP network 208 passes through the first network device. As used herein, a TA is a specific type of network device. For example, in FIG. 2, network device 222*a* is upstream of all network devices 222*b-n* and TAs 220*a-d*, TA 220*b* is upstream of network devices 222*c-e*, etc. In addition, in embodiments consistent with the present invention, network devices that are connected to other upstream network devices with respect to TA 220*a*, for example, are also considered upstream of TA 220*a*. For example, network devices 222*c-h* are considered upstream of TA 220*a*.

In embodiments consistent with the present invention, a first network device that is connected downstream of a second network device is one where the second network device is coupled to the LAN 202 between the first network device and IP network 208, such that any communication between the first network device and IP network 208 passes through the second network device.

In embodiments consistent with the present invention, a first network device that is a sibling of a second network device is one where the first network device and the second network device are both communicatively coupled to a third common upstream network device, and therefore the first and second network devices logically exist at the same hierarchical network level. For example, in some embodiments consistent with FIG. 2, network device 222b is a pass-through hub. In such embodiments, TAs 220a-c are siblings sharing the same parent network device gateway 222a. In addition, as shown in FIG. 2, network device 222i and TA 220d are siblings sharing the same parent network device TA 220a, and network devices 222l, 222m and 222n are siblings sharing the same parent network device 222k. If network device 222k is a pass-through hub, then network devices 222l, 222m and 222n are siblings that share the same parent network device TA 220d. In FIG. 2, sibling connections are shown by links 234.

In embodiments consistent with the present invention, network devices connected upstream of TA 220a are recursively determined. This is accomplished for example, using a network identifier of TA 220a, a DTC table in database 116 may be queried using the network identifier to identify upstream devices directly connected upstream of TA 220a (i.e., to the WAN port of TA 220a). In embodiments consistent with FIG. 2 where a pass-through hub such as 222b is connected to the WAN port of TA 220a, then gateway 222a is considered to be directly connected upstream of TA 220a.

For each upstream device found, an upstream recursive process is performed (discussed below in more detail with respect to FIGS. 3 and 4) which determines all upstream, sibling (i.e., at the same network level), and downstream devices. For example, TA 220a is determined to be connected upstream of TA 220d in LAN 202. The device telemetry data associated with network device 220a (which may include a network identifier of TA 220a) is used to determine all upstream, sibling (i.e., at the same network level), and downstream devices of network device 220a. As shown in FIG. 2, if network device 222b is a pass-through hub, then gateway 222a is determined to be upstream of TA 220a. The DTC table in database 116 may then be queried using the network identifier of gateway 222a to determine any other devices in the DTC table that have the network identifier of gateway 222a included as a WAN address or a LAN address. In some embodiments, the upstream recursive process may only be performed if the upstream network device is determined to be a TA. In other embodiments, the upstream recursive process is performed for all upstream network devices determined. That is, in some embodiments, the upstream recursive process resolves all upstream, sibling, and downstream network devices for any network device determined to be upstream of TA 220a on LAN 202.

Similarly, in embodiments consistent with the present invention, all network devices connected downstream of TA 220a are recursively determined. However, unlike the upstream recursive process, a downstream recursive process (described in more detail below with respect to FIG. 5) resolves sibling and downstream network devices, but not upstream network devices, for any network device determined to be downstream of TA 220 on LAN 202 (i.e., located in block 232 of FIG. 2).

Figure 3:
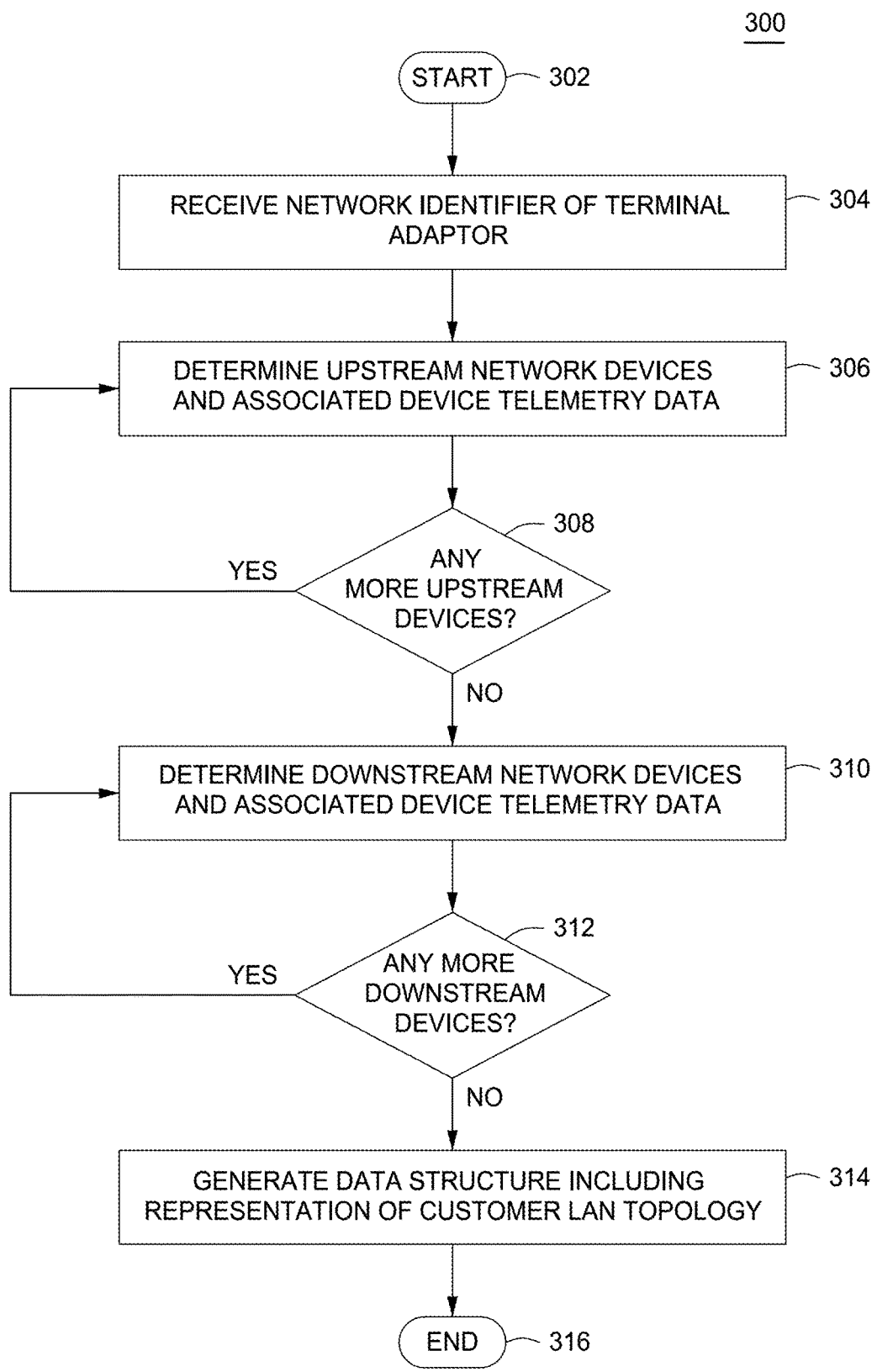
FIG. 3 is a flow diagram depicting a method for identifying logical locations of network devices on a customer's Local Area Network (LAN) in accordance with one or more aspects of the invention.

FIG. 3 depicts a flow diagram of a method 300 of operation for identifying logical locations of network devices on a customer's LAN in accordance with at least one embodiment of the present invention. The method 300 is performed by server 106 in some embodiments consistent with the present invention. The method 300 begins at step 302 and proceeds to step 304, where a network identifier of a TA is received. The network identifier may include, but is not limited to, a MAC address, a LAN IP address, a WAN IP address, and the like. In some embodiments, the network identifier of the TA is received by server 106 from service terminal 112. For example, a customer service representative at a VoIP service provider may be assisting a VoIP customer regarding an issue with their VoIP service. The customer service representative may input a TA MAC address (of a TA being used by the customer on the customer's LAN) via an Internet-based front end running on service terminal 112. The server 106 may receive said MAC address (e.g., a network identifier of the TA adaptor) from service terminal 112 via IP network 108 or connections 114.

The method 300 then proceeds to 306 where all network devices connected upstream of the TA on the customer's LAN are determined along with device telemetry data associated with each determined upstream device and the TA. The method 300 proceeds to step 308, where it is determined whether there are any more upstream network devices. If there are any more upstream network devices, the steps 306 and 308 are performed for each device found until all upstream devices have been resolved. In some embodiments, the upstream recursive procedure of steps 306 and 308 are only performed for each upstream network device that is also determined to be a TA. The upstream recursive procedure for determining upstream devices is described in more detail with respect to FIG. 4 below.

The method 300 then proceeds to 310 where all network devices connected downstream of the TA on a customer's LAN are determined along with device telemetry data associated with each determined downstream device and the TA. At step 312, it is determined whether there are any more downstream network devices. If there are any more downstream network devices, the steps 310 and 312 are performed for each device found until all downstream devices have been resolved. In some embodiments, the downstream recursive procedure of steps 310 and 312 are only performed for each downstream network device that is also determined to be a TA. The downstream recursive procedure for determining downstream devices is described in more detail with respect to FIG. 5 below.

After all upstream and downstream devices with respect to the TA have been resolved, the method 300 proceeds to step 314, where a data structure including representation of customer LAN topology is generated. The representation of the customer LAN topology includes a representation of the network TA, of each determined network device connected to the network TA on the customer's LAN, and of at least some of the associated device telemetry data.

As discussed below with respect to FIG. 4, in some embodiments, the representation of the customer LAN topology will not include network devices with public IP address as those devices will be filtered out by detection of this telemetry parameter. Thus, in some embodiments, each network device includes a private IP address. In addition, as discussed below with respect to FIG. 5, in some embodiments, the representation of the customer LAN topology will only include network devices from a same customer account (i.e., associated with a same customer account number) by performing customer account number filtering.

Specifically, by performing the upstream and downstream recursive processes described herein, it is possible to identify TAs associated with different account numbers (i.e., different customers) on a network. For example, with respect to FIG. 2, assume that the following network devices are also TA's: TA-220*a* (Account Number 10012345); TA-220*b* (Account Number 10087899); TA-220*c* (Account Number 10065633); and TA-222*f* (Account Number 10065633). In this example, only TA-220*c* and TA-222*f* are associated with the same account. However, because TAs 220*a*, 220*b*, and 220*c* are all connected to the same central router (i.e., gateway 222*a*), all TAs regardless of account number are discovered. To address this issue, in some embodiments, account number filtering is performed as described with respect to FIG. 5. As a result of the account filtering performed, in some embodiments consistent with the present invention, all determined downstream devices include a same account as the account of the TA. In some embodiments, each network device includes both a private IP address and a same account as the account of the TA. In some embodiments consistent with the present invention, the representation may be one of a Markup Language (XML) representation or a JavaScript Object Notation (JSON) representation. Other data representations may also be used. The method 300 then ends at 316.

Figure 4:
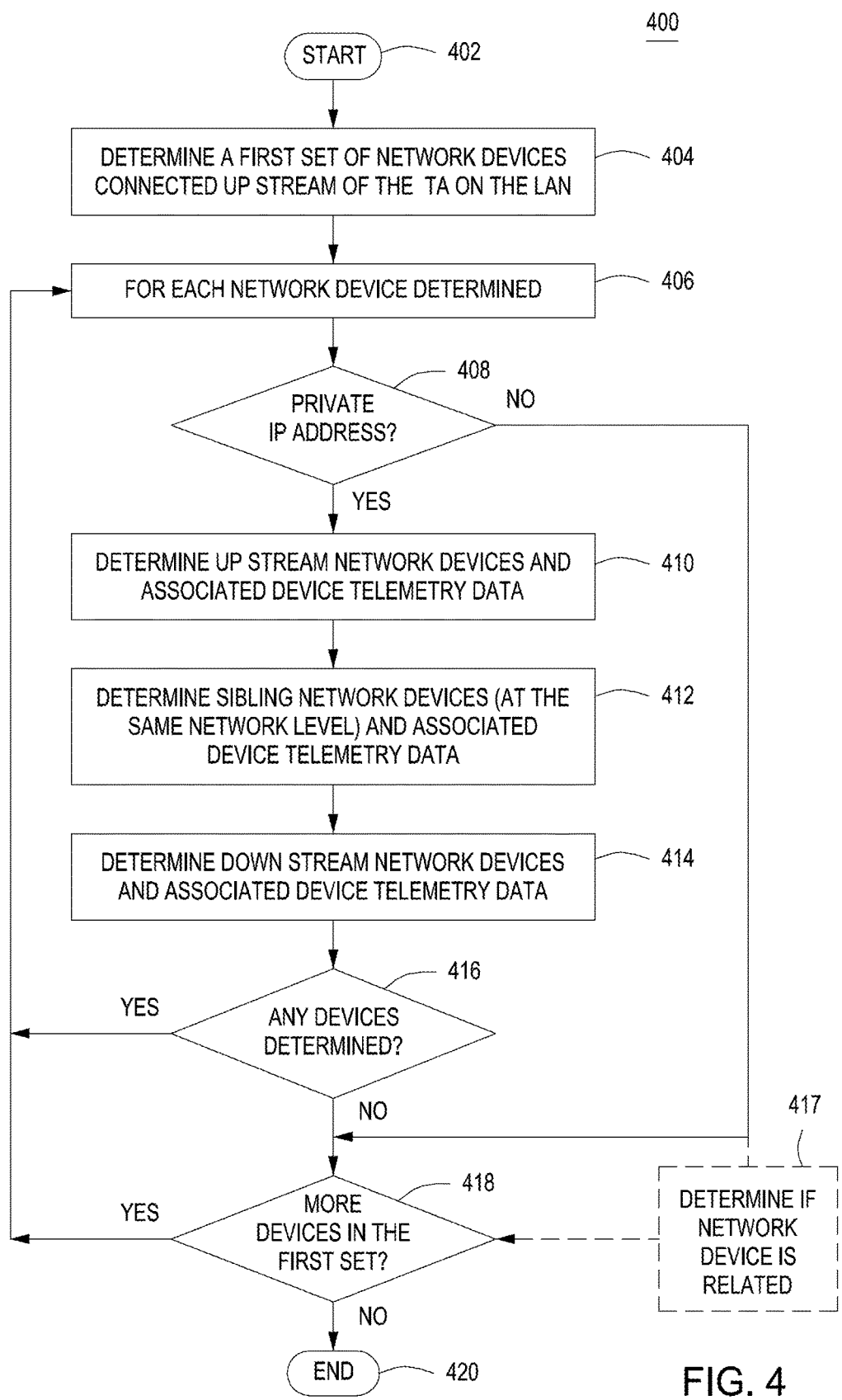
FIG. 4 is a flow diagram depicting an upstream network device recursive method for recursively determining upstream network devices in accordance with one or more aspects of the invention.

FIG. 4 depicts a flow diagram of a method 400 of operation for further determining network devices connected upstream of a TA on a customer's LAN in accordance with one or more embodiments of the present invention. Method 400 is an upstream recursive process that provides further details with respect to step 306 in FIG. 3 and provides public IP filtering to filter out other LANs not associated with the current customer LAN being analyzed. The method 400 begins at step 402 and proceeds to step 404 where a first set of network devices connected upstream of the network TA on the LAN is determined. In embodiments consistent with the present invention, associated device telemetry data for each determined network device in the first set is also determined at this step. The method 400 then performs steps 406 through 416 recursively for each determined network device in the first set, and for each subsequent network device found. Specifically, for each network device determined at step 406, the IP address of the network device is evaluated and filtered. The IP address is stored in the associated device telemetry data.

An IP address is identified as either a public IP address or a private IP address. In some embodiments, the determination of whether an IP address is identified as either a public IP address or a private IP address is based on a function call (e.g., a JAVA call) to determine if the IP address is a local address. An IP address may be determined to be a local address by comparing the IP address to a set of known "unrouteable" addresses. In some embodiments, an "unrouteable" address may be a reserved IP address as defined by the Internet Engineering Task Force (IETF) and the Internet Assigned Numbers Authority (IANA) and published in RFC 1918. Some non-limiting examples of reserved/"unrouteable" address ranges include the 10.0.0.0/8, 172.16.0.0/12, 192.168.0.0/16 IP address ranges. If the IP address of the network device in question is one of these reserved IP addresses, it is considered "private"; otherwise it is considered "public".

If the IP address for the network device is a public IP address, the public IP address is filtered out and no further analysis is performed on any device at the public IP address level (sibling devices) or higher (parent devices). If the IP address is a private IP address, the method 400 proceeds to step 408, where upstream network devices and associated device telemetry data are determined. For example, the method 400 may use a MAC address of a network device included in the associated device telemetry data to determine if that MAC address appears in the DTC table 150 for other network devices (e.g., in a "lan_dhcp_client_table_data" field). Thus, in some embodiments of the present invention, if other network devices include the MAC in their "lan_dhcp_client_table_data" field, they are considered upstream devices.

The method 400 proceeds to step 412, where sibling network devices (at the same network level of the network device being analyzed) and associated device telemetry data are determined. For example, the device telemetry data for each network device in the DTC table 150 includes a "wan_router_mac_address" (i.e., the MAC address of the upstream router it's connected to). Thus, in some embodiments of the present invention, the method 400 can find siblings of a network device by search for other network devices in the DTC table 150 with that same "wan_router_mac_address".

The method 400 proceeds to step 414. At step 414 downstream network devices and associated device telemetry data are determined. For example, the device telemetry data for each network device in the DTC table 150 includes a "lan_dhcp_client_table_data" field (i.e., the MAC address of "children" network devices). Thus, in some embodiments of the present invention, the method 400 can find children of a network device (i.e., downstream network devices) using the "lan_dhcp_client_table_data" field.

At step 416, if network devices were determined in any of steps 410, 412, and 414, the method 400 returns to step 406. At step 416, if no network devices were determined in steps 410, 412, and 414, the method 400 proceeds to step 418. At step 418, if there are more devices in the first set of network devices determined in step 404 that have not been recursively processed, the method 400 returns to step 406. At step 416, if all devices in the first set of network devices determined in step 404 were recursively processed, the method 400 ends at step 420.

If, at step 408, the IP address for the network device is determined to be a public IP address, the device is filtered out and the method 400 proceeds to 418 to determine if there are any more devices in the first set to be analyzed. In some embodiments, however, if the IP address for the network device is determined to be a public IP address, an analysis is optionally performed on the DTC information of the network device to determine if the network device is "related" to the original TA at 417. If the network device is related to the original TA, it is added to the network representation. The determination of whether a network device is "related" includes determining if the network device is a child or parent of an already discovered device associated with the original TA, or if the network device is the original TA. Including "related" devices of network devices having a public IP address advantageously captures any network device that is discovered to be directly upstream of the initial queried TA which is considered important to the representative network diagram created. Thus, even if a device directly upstream includes a public IP address, it is still included in the representative network diagram.

Although not shown in FIG. 4, in some embodiments consistent with the present invention, if an entry for a network device determined in steps 410, 412, and 414 is not found in DTC table 150, the method 400 may search publicly available records (e.g., IEEE records) for the vendor or manufacturer of the network device using the network devices MAC address.

Figure 5:
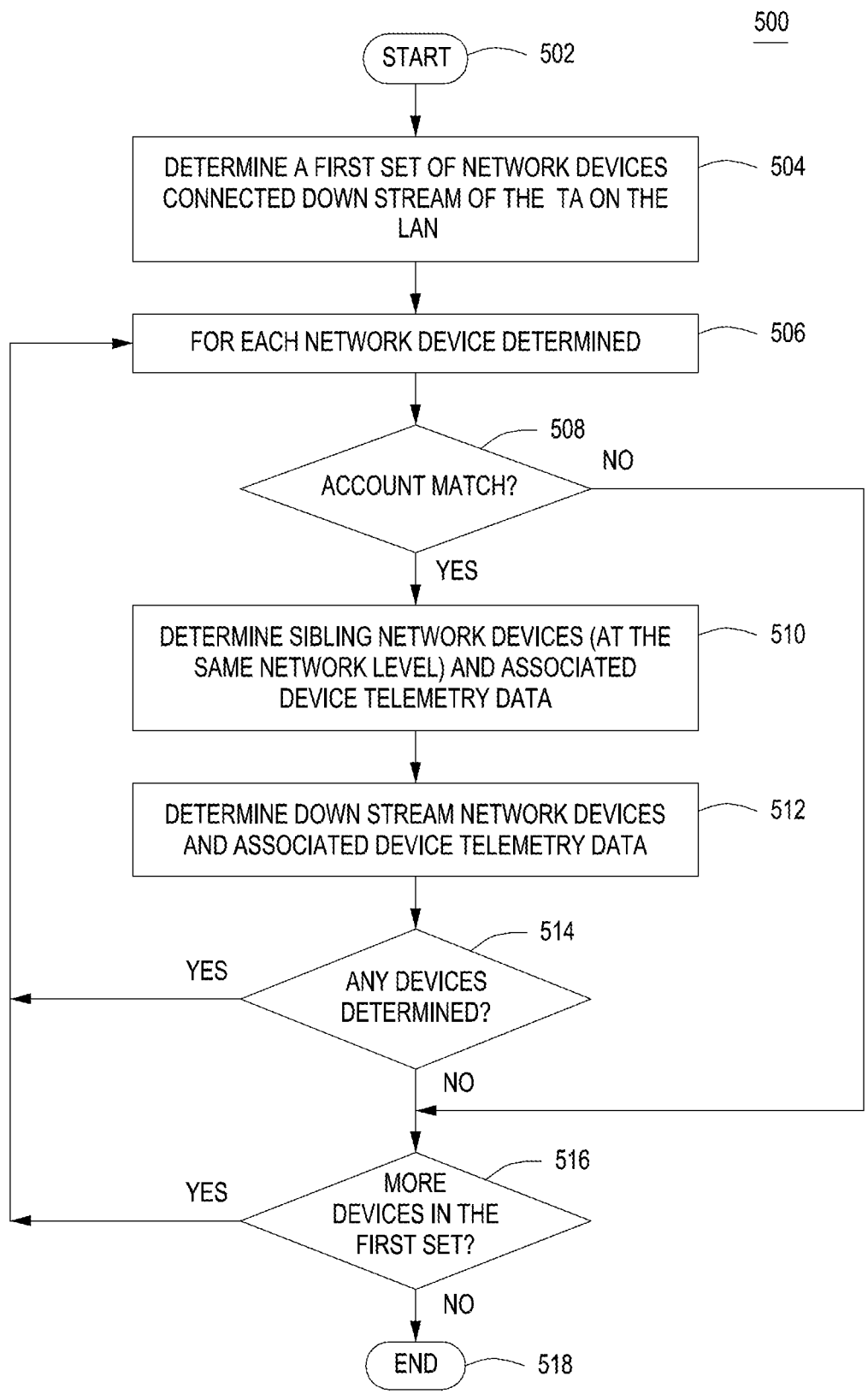
FIG. 5 is a flow diagram depicting a downstream network device recursive method for recursively determining downstream network devices in accordance with one or more aspects of the invention.

FIG. 5 depicts a flow diagram of a method 500 of operation for determining all network devices connected downstream of a TA on a customer's LAN in accordance with one or more embodiments of the present invention. The method 500 is a downstream recursive process that provides further details with respect to step 310 in FIG. 3 and provides customer account number filtering to filter out other customer accounts not associated with the customer account of the initial TA being analyzed. The method 500 begins at 502 and proceeds to 504 where a first set of network devices connected downstream of the network terminal adapter on the LAN is determined. In embodiments consistent with the present invention, associated device telemetry data for each determined network device in the first set is also determined at this step. The method 500 then performs steps 506 through 514 recursively for each determined network device in the first set, and for each subsequent network device found. Specifically, for each network device determined step 506, the method 500 identifies a customer account associated with the network device. Each network device includes customer account information. The customer account may be a customer account number or any identifier that identifies a unique customer associated with the network device stored in the telemetry data for the network device. The account for the network device is identified/retrieved from the associated device telemetry data. If the account for the network device does not match an account for the TA, the method 500 proceeds to step 516. However, if the account for the network device matches the account for the TA, the method 500 proceeds to step 510. At step 510, sibling network devices (at the same network level of the network device being analyzed) and associated device telemetry data are determined. The method 500 proceeds to step 512, where downstream network devices and associated device telemetry data are determined. At step 514, if network devices were determined in any of steps 510 and 512, the method 500 returns to step 506. At step 514, if no network devices were determined in steps 510 and 512, the method 500 proceeds to step 516. At step 516, if there are more devices in the first set of network devices determined in step 504 that have not been recursively processed, the method 500 returns to step 506. At step 516, if all devices in the first set of network devices determined in step 504 were recursively processed, the method 500 ends at 518.

Figure 6:
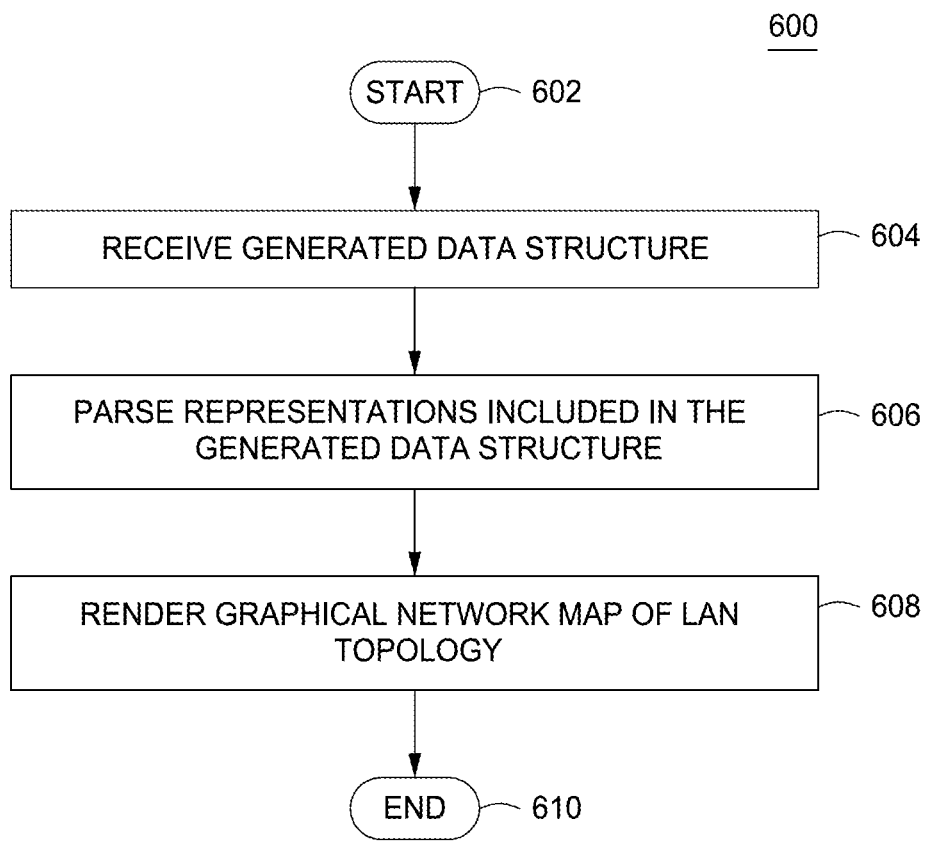
FIG. 6 is a flow diagram depicting a method for generating a graphical network map in accordance with one or more aspects of the invention.

FIG. 6 depicts a flow diagram of a method 600 of operation for rendering, a graphical network map including the network TA and each determined network device connected to the LAN in accordance with one or more embodiments of the present invention. The method 600 begins at 602 and proceeds to 604 where a generated data structure is received. In some embodiments consistent with the present invention, the data structure includes XML or JSON data representations of a customer's network topology (i.e., the topology of the customer's LAN). The data structure is generated consistent with embodiments described above. At step 606, the representations included in the generated data structure are parsed. At step 608, the parsed representations are used to render a graphical network map of the customer's LAN topology. The method ends at 610.

Figure 7A:
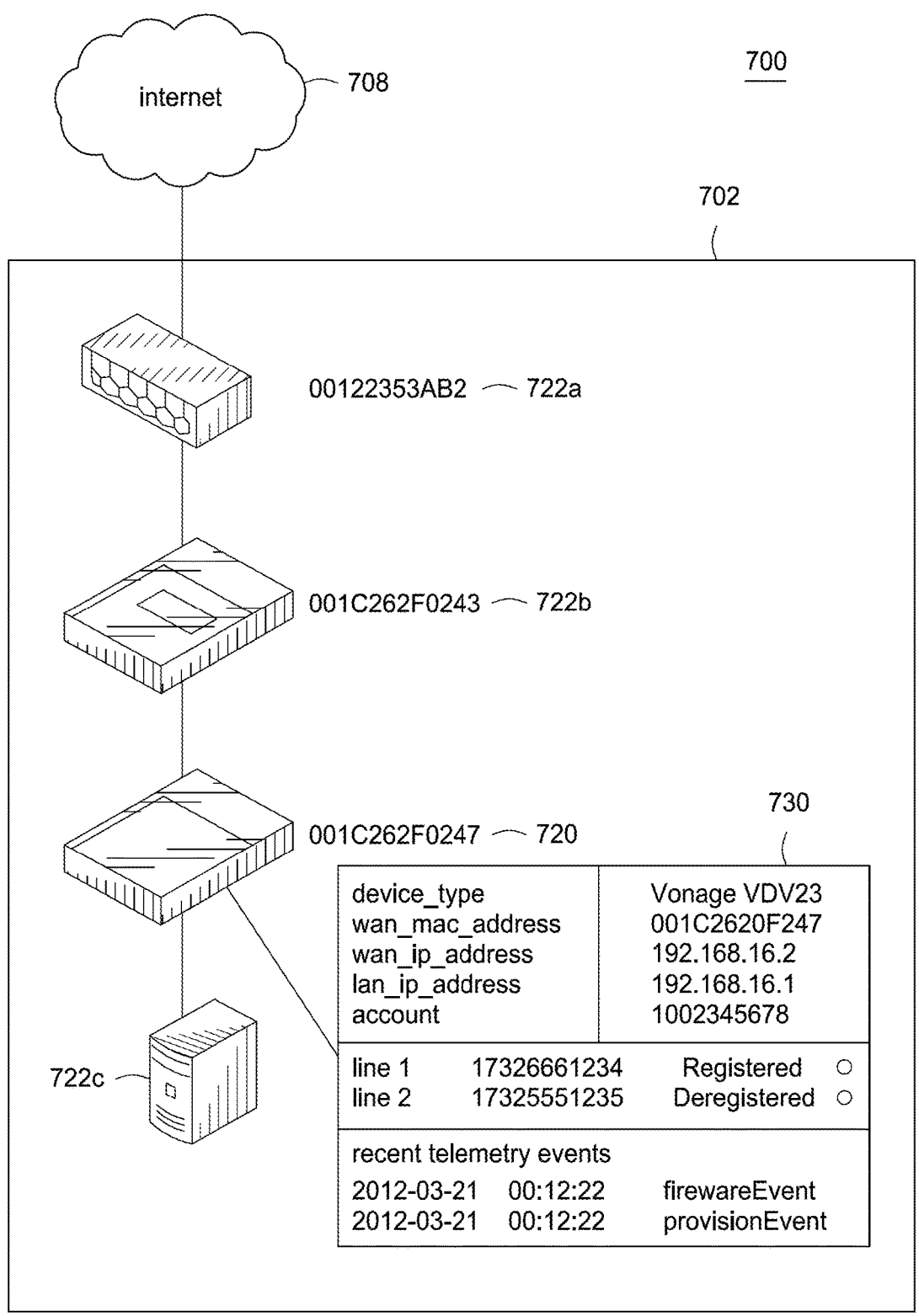
FIGS. 7A and 7B are block diagrams depicting an exemplary graphical network map of a customer's LAN topology in accordance with one or more aspects of the invention.

FIG. 7A depicts an exemplary graphical network map 700 of a customer's LAN topology consistent with some embodiments described herein. In the network configuration shown in FIG. 7A, a customer LAN 702 includes a TA 720 coupled to the LAN 702. The graphical network map displays two upstream network devices 722a and 722b and one downstream device 722c are also coupled to the LAN. In addition, an IP Network 708 is shown for reference coupled to LAN 702 via network device 722a. In some embodiments, the TA 720 and each of the network devices 722a-c are objects that can be selected or activated by a user to display more information. A "selection" by a user may include, but is not limited to, a mouse click, hovering over the object with a mouse point or other type input device, a touch screen selection using a finger or other type of input device, and the like. In FIG. 7A, at least some device telemetry data 730 of TA 720 is shown responsive to a selection of TA 720 on the graphical network map.

Figure 7B:
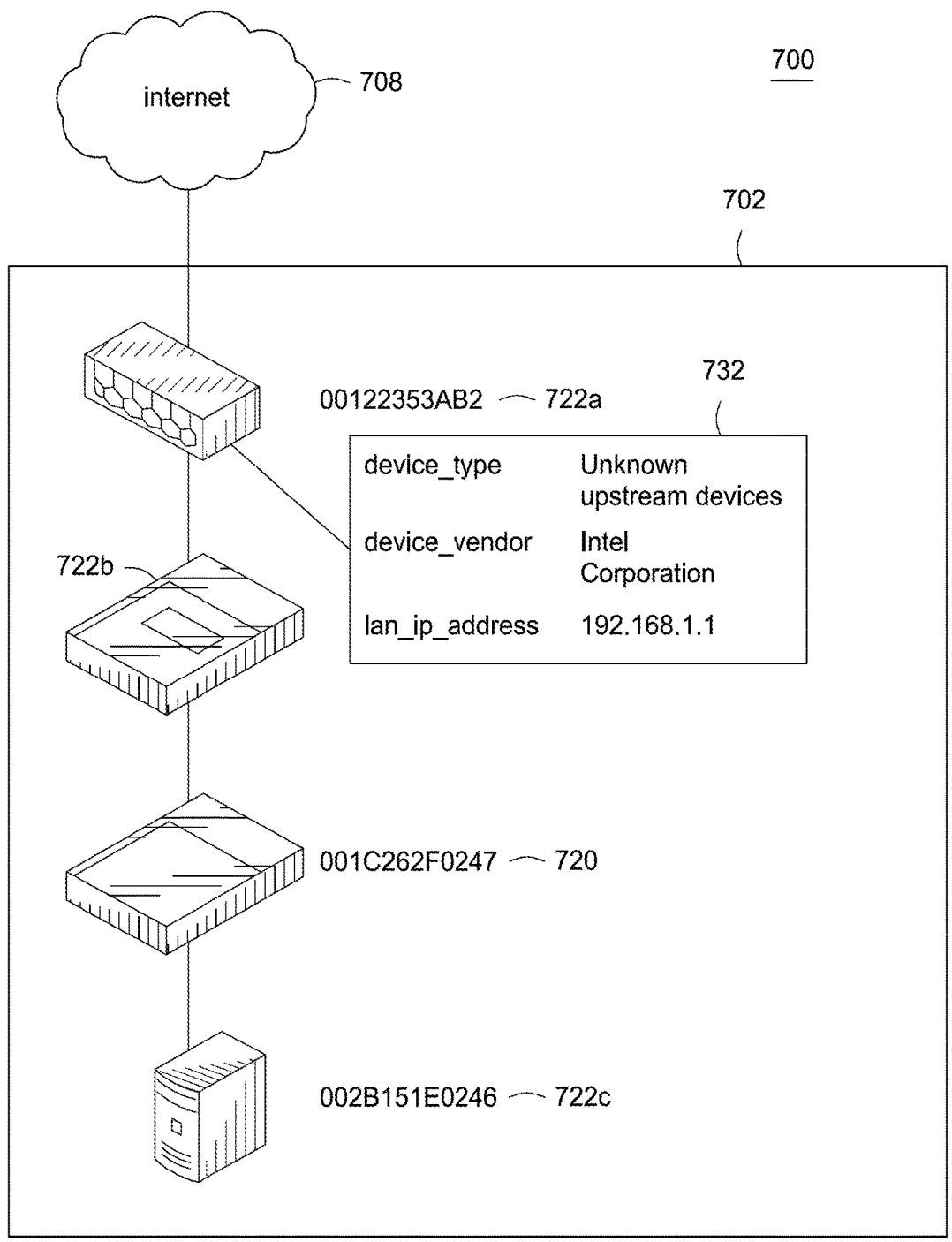

In FIG. 7B, the same elements of FIG. 7A are shown except that at least some device telemetry data 732 of network device 722a is shown responsive to a selection of network device 722a on the graphical network map.

Although not shown, the graphical user map may display differences in different network configurations that may have existed on different dates with respect to a customer's LAN. The prior configuration may be displayed as grayed or in a different color to emphasis the differences.

The foregoing description of embodiments of the invention comprises a number of elements, devices, circuits and/or assemblies that perform various functions as described. For example, support circuits 142 are an example of a means for receiving an input including a network identifier of a network terminal adaptor on a LAN, and one or more processors 140 and LAN topology generation application 148 are examples of means for determining, using the received network identifier, network devices connected upstream and downstream of the network terminal adapter on the LAN, and device telemetry data associated with each determined network device and the network terminal adaptor and a means for generating, using the device telemetry data, a data structure including a representation of the network terminal adaptor, of each determined network device connected to the network terminal adaptor on the LAN, and of at least some of the associated device telemetry data. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow.

What is claimed is:

1. A method for identifying logical locations of network devices on a Local Area Network (LAN), at least a portion of the method being performed by a computer system comprising at least one processor, the method comprising:
receiving, from each of a plurality of network devices connected on the LAN, device telemetry environmental data, wherein the telemetry environmental data is automatically transmitted from each of the plurality of network devices on the LAN on one of a daily basis, upon startup of each device, or on a schedule;
storing the received device telemetry environmental data in a first data structure;
receiving an input including a network identifier of a network terminal adaptor (TA) on the LAN;
querying the first data structure of previously received device telemetry environmental data of the LAN, based on the received network identifier, to determine one or more network devices connected upstream of the TA, wherein a network address of each of the one or more network devices connected upstream is filtered such that only network devices including a private IP address are identified;

querying the first data structure of previously received device telemetry environmental data of the LAN, based on the received network identifier, to determine network devices connected downstream of the network terminal adapter on the LAN;

determining device telemetry environmental data associated with each determined network device and the network terminal adaptor; and generating, using the device telemetry environmental data, a second data structure including (a) a representation of a logical location of the network terminal adaptor and of each determined network device connected to the LAN, and (b) at least some of the device telemetry environmental data.

2. The method of claim 1, wherein determining network devices connected upstream of the network terminal adapter on the LAN includes:

determining, using the received network identifier, a first set of network devices connected upstream of the network terminal adapter on the LAN and device telemetry environmental data associated with each of the network devices in the first set;

determining, using the device telemetry environmental data associated with each determined network device in the first set, whether each determined network device includes a private IP address; and determining, when the determined network device includes a private IP address, a further set of network devices connected upstream, at a same level, and downstream of each network device included in the first set, and device telemetry environmental data associated with each network device in the further set.

3. The method of claim 2, wherein determining the further set of network devices is recursively performed for each determined network device connected upstream including a private IP address, at the same level, and downstream of the network devices in the further set and until at least one of no new network devices are determined.

4. The method of claim 1, wherein determining network devices connected downstream of the network terminal adapter on the LAN includes:

determining, using the received network identifier, a first set of network devices connected downstream of the network terminal adapter on the LAN and device telemetry environmental data associated with each determined network device in the first set; and determining, using the device telemetry environmental data associated with each determined network device in the first set, a further set of network devices connected downstream and at a same level of each network device included in the first set, and device telemetry environmental data associated with each network device in the further set.

5. The method of claim 4, further comprising:

determining, using the device telemetry environmental data associated with each determined network device in the first set, a further set of network devices connected downstream and at a same level of each network device included in the first set, and device telemetry environmental data associated with each network device in the further set, wherein each determined network device in the first set includes a same customer account number as a customer account number of the network terminal adaptor on the LAN.

6. The method of claim 4, wherein determining the further set of network devices is recursively performed for each determined network device connected downstream and at the same level of the network devices in the further set and until no new network devices are determined.

7. The method of claim 1, wherein the network terminal adaptor is a Voice-over Internet Protocol (VoIP) terminal adaptor.

8. The method of claim 1, wherein the received network identifier is a Media Access Control (MAC) address.

9. The method of claim 1, wherein determining the network devices and the associated device telemetry environmental data using the received network identifier includes using the received network identifier of the network terminal adaptor as a search query input of a device telemetry data table.

10. The method of claim 1, wherein the determined device telemetry environmental data associated with each of the determined network devices connected upstream and downstream of the network terminal adaptor includes at least one of a Media Access Control (MAC) address, a Wide Area Network (WAN) internet protocol (IP) address, a LAN IP address, a device manufacturer, a model identifier, a software version of identified network device, or an account.

11. The method of claim 1, wherein a format of the generated data structure is one of an Extensible Markup Language (XML) representation or JavaScript Object Notation (JSON) representation.

12. The method of claim 1, further comprising:

accessing the generated data structure;

parsing the representation and the at least some of the device telemetry environmental data included in the generated data structure; and rendering, using the parsed representation and device telemetry environmental data, a graphical network map including the network terminal adaptor and each determined network device connected to the LAN.

13. The method of claim 12, wherein the network terminal adaptor and each determined network device connected to the LAN included on the rendered graphical network map are selectable, and wherein responsive to a user selection of the network terminal adaptor or at least one of the network device included on the graphical network map, at least some device telemetry environmental data associated with the selected network terminal adaptor or the at least one network device is displayed.

14. The method of claim 1, wherein the received input further includes a configuration date of a specific LAN configuration and wherein the determined network devices were connected to the LAN on the configuration date received.

15. The method of claim 1, further comprising:

determining, using the received network identifier, one or more network devices having a public IP address connected upstream of the TA; and determining if the one or more network devices having a public IP address is one of an upstream device or a downstream device of an already identified network device associated with the TA, or if the one or more network devices is the TA.

16. A system for identifying logical locations of network devices on a Local Area Network (LAN), comprising:

one or more servers configured to receive device telemetry information from a plurality of network devices disposed on customers' local area networks (LANs), wherein the telemetry information is automatically transmitted from each of the plurality of network devices on the LAN on one of a daily basis, upon startup of each device, or on a schedule;

a device telemetry database that stores the device telemetry information received by the one or more servers; and a LAN topology generation application configured to:
receive an input including a network identifier of a network terminal adaptor on a LAN;
query the device telemetry database to determine, using the received network identifier, one or more network devices connected upstream or downstream of the network terminal adapter, wherein a network address of each of the one or more network devices connected upstream is filtered such that only network devices including a private IP address are identified;
determine device telemetry data associated with each determined network device and the network terminal adaptor; and
generate, using the device telemetry data, a data structure including (a) a representation of a logical location of the network terminal adaptor and of each determined network device connected to the LAN, and (b) at least some of the device telemetry data.

17. The system of claim 16, wherein, to identify the network devices connected upstream of the network terminal adapter on the LAN, the LAN topology generation application is further configured to:
determine, using the received network identifier, a first set of network devices connected upstream of the network terminal adapter on the LAN and device telemetry data associated with each of the network devices in the first set;
determine, using the device telemetry data associated with each determined network device in the first set, whether each determined network device includes a private IP address; and
determine, when the determined network device includes a private IP address, a further set of network devices connected upstream, at a same level, and downstream of each network device included in the first set, and device telemetry data associated with each network device in the further set, wherein determining the further set of network devices is recursively performed for each determined network device connected upstream, at the same level, and downstream of the network devices in the further set and until at least one of no new network devices are determined or a network device is determined to include a public IP address.

18. The system of claim 16, wherein, to identify the network devices connected downstream of the network terminal adapter on the LAN, the LAN topology generation application is further configured to:
determine, using the received network identifier, a first set of network devices connected downstream of the network terminal adapter on the LAN and device telemetry data associated with each determined network device in the first set; and
determine, using the device telemetry data associated with each determined network device in the first set, a further set of network devices connected downstream and at a same level of each network device included in the first set, and device telemetry data associated with each network device in the further set.

19. The system of claim 18, wherein the LAN topology generation application is further configured to:
determine, using the device telemetry data associated with each determined network device in the first set, a further set of network devices connected downstream and at a same level of each network device included in the first set, and device telemetry data associated with each network device in the further set,
wherein each determined network device in the first set includes a same customer account number as a customer account number of the network terminal adaptor on the LAN.

20. The system of claim 18, wherein, to determine the further set of network devices, the LAN topology generation application is configured to recursively performed for each determined network device connected downstream and at the same level of the network devices in the further set and until no new network devices are determined.

21. The system of claim 16, wherein the LAN topology generation application is further configured:
determine, using the received network identifier, one or more network devices having a public IP address connected upstream of the network terminal adapter; and
determine if the one or more network devices having a public IP address is one of an upstream device or a downstream device of an already identified network device associated with the network terminal adapter, or if the one or more network devices is the network terminal adapter.

22. A computer readable medium storing a software program that, when executed by a computer, causes the computer to perform a method for identifying logical locations of network devices on a Local Area Network (LAN) comprising:
receiving, from each of a plurality of network devices connected on the LAN, device telemetry environmental data, wherein the telemetry environmental data is automatically transmitted from each of the plurality of network devices on the LAN on one of a daily basis, upon startup of each device, or on a schedule;
storing the received device telemetry environmental data in a first data structure;
receiving an input including a network identifier of a network terminal adaptor on a LAN;
querying the first data structure of previously received device telemetry environmental data of the LAN, based on the received network identifier, to determine one or more network devices connected upstream of the network terminal adapter, wherein a network address of each of the one or more network devices connected upstream is filtered such that only network devices including a private IP address are identified;
querying the first data structure of previously received device telemetry environmental data of the LAN, based on the received network identifier, to determine network devices connected downstream of the network terminal adapter on the LAN;
determining device telemetry environmental data associated with each determined network device and the network terminal adaptor; and
generating, using the device telemetry environmental data, a data structure including (a) a representation of a logical location of the network terminal adaptor and of each determined network device connected to the LAN, and (b) at least some of the device telemetry environmental data.

\* \* \* \* \*